United States Patent
Schmit et al.

(10) Patent No.: US 10,440,359 B2
(45) Date of Patent: Oct. 8, 2019

(54) HYBRID VIDEO ENCODER APPARATUS AND METHODS

(71) Applicant: Advanced Micro Devices, Inc., Sunnyvale, CA (US)

(72) Inventors: Michael L. Schmit, Cupertino, CA (US); Radhakrishna Giduthuri, Campbell, CA (US); Rajy Meeyakhan Rawther, San Jose, CA (US); Vicky W. Tsang, Palo Alto, CA (US); Passant V. Karunaratne, Palo Alto, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1573 days.

(21) Appl. No.: 13/905,770

(22) Filed: May 30, 2013

(65) Prior Publication Data

US 2014/0334545 A1 Nov. 13, 2014

Related U.S. Application Data

(60) Provisional application No. 61/821,059, filed on May 8, 2013.

(51) Int. Cl.
*H04N 19/51* (2014.01)
*H04N 19/577* (2014.01)
*H04N 19/105* (2014.01)
*H04N 19/172* (2014.01)
*H04N 19/15* (2014.01)
*H04N 19/115* (2014.01)
*H04N 19/142* (2014.01)
*H04N 19/42* (2014.01)

(52) U.S. Cl.
CPC ......... *H04N 19/105* (2014.11); *H04N 19/115* (2014.11); *H04N 19/142* (2014.11); *H04N 19/15* (2014.11); *H04N 19/172* (2014.11); *H04N 19/42* (2014.11)

(58) Field of Classification Search
CPC ..... H04N 19/105; H04N 19/42; H04N 19/142
See application file for complete search history.

(56) References Cited

U.S. PATENT DOCUMENTS 8,542,732 B1 * 9/2013 Lewis ................. H04N 19/433
  19/433
2004/0190617 A1 * 9/2004 Shen .................... H04N 19/159
  375/240.16

(Continued)

*Primary Examiner* — Tsion B Owens
(74) *Attorney, Agent, or Firm* — Volpe and Koenig, P.C.

(57) ABSTRACT

Methods and apparatus for video processing are disclosed. In one embodiment the work of processing of different types of video frames is allocated between a plurality of computing resources. For example, different computing resources for can be used for I, P and B frames, where an I frame is an intra-frame encoded with no other frames as a reference; a P frame is encoded with one previous I or P frame as a reference and a B frame is encoded with one previous and one future frame as references. In one example, a central processing unit (CPU) performs encoding of I frames and P frames of a video and a graphics processing unit (GPU) performs initial encoding of B frames of the video in connection with a fixed function video encoder configured to perform entropy encoding of the B frames.

14 Claims, 7 Drawing Sheets

| Input Frame | | pipeline stage ---> | | | | | | | | | | | | | |
|---|---|---|---|---|---|---|---|---|---|---|---|---|---|---|---|
| num | type | 1 | 2 | 3 | 4 | 5 | 6 | 7 | 8 | 9 | 10 | 11 | 12 | 13 | 14 | 15 |
| 1 | I | E1 | CR1 | | | | | | | | | | | | |
| 2 | B | | CP2 | | | | K2 | EN2 | CS2 | | | | | | |
| 3 | B | | | CP3 | | | K3 | EN3 | CS3 | | | | | | |
| 4 | P | | | | E4 | CR4 | | | | | | | | | |
| 5 | B | | | | | CP5 | | | | K5 | EN5 | CS5 | | | |
| 6 | B | | | | | | CP6 | | | K6 | EN5 | CS6 | | | |
| 7 | P | | | | | | | E7 | CR7 | | | | | | |
| 8 | B | | | | | | | | CP8 | | | K8 | EN8 | CS8 | |
| 9 | B | | | | | | | | | CP9 | | | K9 | EN9 | CS9 |
| 10 | P | | | | | | | | | | E10 | CR10 | | | |
| finished order: | | 1 | | | 4 | | | 2 | 3 | 7 | 5 | 6 | 10 | 8 | 9 |

En   Encode frame n on CPU
CRn  Copy Reference frame n from CPU to GPU (3 MB)
CPn  Copy frame n from CPU to GPU (3 MB)
Kn   Execute Kernels for frame n on GPU shaders
ENn  Entropy encode for frame n on VCE
CSn  Copy encoded Stream from GPU to CPU

(56) References Cited

U.S. PATENT DOCUMENTS

| | | | |
|---|---|---|---|
| 2006/0056708 A1* | 3/2006 | Shen | H04N 21/4143 382/232 |
| 2009/0080533 A1* | 3/2009 | Folta | H04N 19/159 375/240.25 |
| 2009/0160865 A1* | 6/2009 | Grossman | H04N 9/87 345/502 |
| 2013/0022102 A1* | 1/2013 | Casula | H04N 19/176 375/240.02 |
| 2014/0139513 A1* | 5/2014 | Mammou | G06T 9/001 345/419 |

* cited by examiner

| Input Frame | | pipeline stage ---> | | | | | | | | | | | | | | |
|---|---|---|---|---|---|---|---|---|---|---|---|---|---|---|---|---|
| num | type | 1 | 2 | 3 | 4 | 5 | 6 | 7 | 8 | 9 | 10 | 11 | 12 | 13 | 14 | 15 |
| 1 | I | E1 | CR1 | | | | | | | | | | | | | |
| 2 | B | | CP2 | CP3 | | | K2 | EN2 | CS2 | | | | | | | |
| 3 | B | | | CP3 | E4 | CR4 | | K3 | EN3 | CS3 | | | | | | |
| 4 | P | | | | E4 | CR4 | | | | | | | | | | |
| 5 | B | | | | | CP5 | | | | K5 | EN5 | CS5 | | | | |
| 6 | B | | | | | | CP6 | | | | K6 | EN6 | CS6 | | | |
| 7 | P | | | | | | | E7 | CR7 | | | | | | | |
| 8 | B | | | | | | | | CP8 | | | | K8 | EN8 | CS8 | |
| 9 | B | | | | | | | | | CP9 | | | K9 | EN9 | CS9 | |
| 10 | P | | | | | | | | | | E10 | CR10 | | | | |
| finished order: | | 1 | | | 4 | | | 2 | 3 | | 7 | 5 | 6 | | 10 | 8 | 9 |

En — Encode frame n on CPU
CRn — Copy Reference frame n from CPU to GPU (3 MB)
CPn — Copy frame n from CPU to GPU (3 MB)
Kn — Execute Kernels for frame n on GPU shaders
ENn — Entropy encode for frame n on VCE
CSn — Copy encoded Stream from GPU to CPU

Figure 2

| Input Frame | | pipeline stage ---> | | | | | | | | | | | | | | | | | |
|---|---|---|---|---|---|---|---|---|---|---|---|---|---|---|---|---|---|---|---|
| num | type | 1 | 2 | 3 | 4 | 5 | 6 | 7 | 8 | 9 | 10 | 11 | 12 | 13 | 14 | 15 | 16 | 17 | 18 |
| 1 | I | E1 | E1 | E1 | E1 | CR1 | | | | | | | | | | | | | |
| 2 | B | | CP2 | | | | | | | | K2 | EN2 | CS2 | | | | | | |
| 3 | B | | | CP3 | | | | | | | K3 | EN3 | CS3 | | | | | | |
| 4 | P | | | | E4 | E4 | E4 | E4 | CR4 | | | | | | | | | | |
| 5 | B | | | | | CP5 | | | | | | | K5 | EN5 | CS5 | | | | |
| 6 | B | | | | | | CP6 | | | | | | | K6 | EN6 | CS6 | | | |
| 7 | P | | | | | | | E7 | E7 | E7 | E7 | CR7 | | | | | | | |
| 8 | B | | | | | | | | CP8 | | | | | | | K8 | EN8 | CS8 | |
| 9 | B | | | | | | | | | CP9 | | | | | | | K9 | EN9 | CS9 |
| 10 | P | | | | | | | | | | E10 | E10 | E10 | E10 | CR10 | | | | |
| finished order: | | | | | 1 | | | 4 | | | 2 | 3 | 7 | 5 | 6 | 10 | 8 | 9 |

En — Encode frame n on CPU
CRn — Copy Reference frame n from CPU to GPU (3 MB)
CPn — Copy frame n from CPU to GPU (3 MB)
Kn — Execute Kernels for frame n on GPU shaders
ENn — Entropy encode for frame n on VCE
CSn — Copy encoded Stream from GPU to CPU

Figure 3

| Input Frame | | pipeline stage ---> | | | | | | | | | | | |
|---|---|---|---|---|---|---|---|---|---|---|---|---|---|
| num | type | 1 | 2 | 3 | 4 | 5 | 6 | 7 | 8 | 9 | 10 | 11 | 12 |
| 1 | I | E1 | E1 | E1 | E1 | CR1 | | | | | | | |
| 2 | B | CP2 | | | | | | | | K2 | EN2 | CS2 | |
| 3 | B | | CP3 | | | | | | | | K3 | EN3 | CS3 |
| 4 | P | | | | E4 | E4 | E4 | E4 | CR4 | | | | |

En — Encode frame n on CPU
CRn — Copy Reference frame n from CPU to GPU (3 MB)
CPn — Copy frame n from CPU to GPU (3 MB)
Kn — Execute Kernels for frame n on GPU shaders
ENn — Entropy encode for frame n on VCE
CSn — Copy encoded Stream from GPU to CPU

Figure 4

| Input Frame | | pipeline stage → | | | | | | | | | | | | | | | | | | | | |
|---|---|---|---|---|---|---|---|---|---|---|---|---|---|---|---|---|---|---|---|---|---|---|
| num | type | 1 | 2 | 3 | 4 | 5 | 6 | 7 | 8 | 9 | 10 | 11 | 12 | 13 | 14 | 15 | 16 | 17 | 18 | 19 | 20 | 21 |
| 1 | I | E1 | E1 | E1 | E1 | E1 | E1 | E1 | CR1 | | | | | | | | | | | | | |
| 2 | B | | CP2 | | | | | | | | | | K2 | EN2 | CS2 | | | | | | | |
| 3 | B | | | CP3 | | | | | | | | | | K3 | EN3 | CS3 | | | | | | |
| 4 | P | | | | E4 | E4 | E4 | E4 | E4 | E4 | E4 | CR4 | | | | | | | | | | |
| 5 | B | | | | | CP5 | | | | | | | | | | K5 | EN5 | CS5 | | | | |
| 6 | B | | | | | | CP6 | | | | | | | | | | K6 | EN6 | CS6 | | | |
| 7 | P | | | | | | | E7 | E7 | E7 | E7 | E7 | E7 | E7 | CR7 | | | | | | | |
| 8 | B | | | | | | | | CP8 | | | | | | | | | K8 | EN8 | CS8 | | |
| 9 | B | | | | | | | | | CP9 | | | | | | | | | K9 | EN9 | CS9 | |
| 10 | P | | | | | | | | | | E10 | E10 | E10 | E10 | E10 | E10 | E10 | E10 | CR10 | | | |
| finished order: | | | | | | | | 1 | | | 4 | | | 2 | 3 | 7 | | 5 | 6 | 10 | 8 | 9 |

En     Encode frame n on CPU
CRn    Copy Reference frame n from CPU to GPU (3 MB)
CPn    Copy frame n from CPU to GPU (3 MB)
Kn     Execute Kernels for frame n on GPU shaders
ENn    Entropy encode for frame n on VCE
CSn    Copy encoded Stream from GPU to CPU

Figure 6

| Input Frame | | pipeline stage ---> | | | | | | | | | | | | | | | | | | | | | | |
|---|---|---|---|---|---|---|---|---|---|---|---|---|---|---|---|---|---|---|---|---|---|---|---|---|
| num | type | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| 1 | I | E1 | E1 | E1 | E1 | CR1 | | | | | | | | | | | | | | | | | | |
| 2 | B | CP2 | | | | | | | | | | | | | | | | | | | | | | |
| 3 | B | | | CP3 | | | | | | | | | | | | | | | | | | | | |
| 4 | P | | | | | E4 | E4 | E4 | E4 | CR4 | | | | | | | | | | | | | | |
| 5 | B | | | | | CP5 | | | | | | | | | | | | | | | | | | |
| 6 | B | | | | | | CP6 | | | | | | | | | | | | | | | | | |
| 7 | P | | | | | | | E7 | E7 | E7 | E7 | CR7 | | | | | | | | | | | | |
| 8 | B | | | | | | | | CP8 | | | | | | | | | | | | | | | |
| 9 | B | | | | | | | | | CP9 | | | | | | | | | | | | | | |
| 10 | P | | | | | | | | | | K2 | K2 | EN2 CS2 | | | | | | | | | | | |
| | | | | | | | | | | | | | K3 | K3 | EN3 CS3 | | | | | | | | | |
| | | | | | | | | | | | | | | | | K5 | K5 | K5 | EN5 CS5 | | | | | |
| | | | | | | | | | | | | | | | | | | | K6 | K6 | K6 | EN6 CS6 | | |
| | | | | | | | | | | | E10 | E10 | E10 | E10 | CR10 | | | | | | | | | |
| finished order: | | 1 | | | 4 | | | | | | 2 | | | | 3 | | 7 | | 5 | | 6 | | | 10 |

En — Encode frame n on CPU
CRn — Copy Reference frame n from CPU to GPU (3 MB)
CPn — Copy frame n from CPU to GPU (3 MB)
Kn — Execute Kernels for frame n on GPU shaders
ENn — Entropy encode for frame n on VCE
CSn — Copy encoded Stream from GPU to CPU

HYBRID VIDEO ENCODER APPARATUS AND METHODS

CROSS REFERENCE TO RELATED APPLICATION

This application claims the benefit of U.S. Provisional Patent Application No. 61/821,059 filed May 8, 2013, which is incorporated by reference as if fully set forth.

FIELD OF THE INVENTION

The present invention is generally directed to video processing methods and apparatus.

BACKGROUND

Video processing systems are employed in various applications, including high-definition television, computer displays, and internet video streaming. Such applications often demand compact cost-effective systems for encoding, transmitting, and decoding high quality video relatively accurately, quickly, and efficiently.

Efficient video processing systems are particularly important in so-called H.264 applications, where video processing systems are the subject of strict standards. H.264 is digital video coding standard written by the Joint Video Team (JVT) comprising the International Telecommunication Union (ITU)—Telecommunication Standardization Sector (T) and the International Organization for Standardization (ISO)/International Electrotechnical Commission (IEC) Moving Picture Experts Group (MPEG). The H.264 standard is also called the ISO/IEC MPBG-4 Part 10 standard or the ITU-T H.264 standard.

In an example H.264 system, pixels of a video image are logically grouped into 16×16 blocks of pixels called macroblocks. The image is also partitioned into horizontal bands, called slices, each containing several macroblocks. Conventionally, a video frame is partitioned into multiple slices, and sub-optimal motion search methods are used due to relatively inefficient video processing methods and hardware speed constraints.

SUMMARY

Methods and apparatus for video processing are disclosed. A video comprising a plurality of frames is encoded by selectively using a plurality of computing resources selectively utilized to encode various types of frames of the video where the frames are categorized based on a frame's referential relationship to other frames of the video. Different computing resources are used to partially or fully perform the encoding process of at least one type of frame than are used for at least one other type of frame. For example, the types of frames may include I frames that are intra-frame encoded with no other frames as a reference, P frames encoded with one previous I or P frame as a reference and B frames encoded with one previous and one future frame as references and the B frames are encoded using different computing resources than used for the I or P types of the frames.

In one embodiment the work of processing of video frames is allocated between one or more central processing units (CPUs) and graphics processing units (GPUs) where the processing of different types of frames is performed by a CPU or a GPU. The CPUs and GPUs may be included in an accelerated processing unit (APU).

In one example, one or more CPUs perform encoding of I frames and P frames and a GPU performs encoding of B frames of a video. In such example, the GPU may include shaders configured to process kernels of frame data for the B frames and a fixed function video encoder configured to perform entropy encoding of the B frames. In a modification of such example, some or all of the P frames may be encoded using the same resources as the B frames and the I frames are encoded using one or more CPUs. Similarly, some or all of the I frames may be encoded using the same resources as the B frames and the P frames are encoded using one or more CPUs.

In a further modification of such example, the GPU shaders are used to process kernels of frame data for the B frames, the fixed function video encoder is used to perform entropy encoding of the I, P and/or B frames, and one or more CPUs are used to perform other portions of the encoding processing of either the I or P frames or both the I and P frames.

The fixed function video encoder may be in the form of a Video Codec Engine (VCE) configured to perform full processing of video frames with a selectable mode for receiving the results of kernel execution to perform entropy encoding of frames. The fixed function video encoder or VCE may reside as a separate component outside of a GPU and may be a separate component within an APU.

In addition, another embodiment provides a non-transitory computer-readable storage medium storing a set of instructions for execution by a general purpose computer to facilitate manufacture of a selectively designed integrated circuit. The non-transitory computer-readable storage medium contains instructions that are hardware description language (HDL) instructions used for the manufacture of a device including one or more aspects of the embodiments.

Such an integrated circuit may include a plurality of computing resources selectively configured to encode various types of frames of a video where the frames are categorized based on a frame's referential relationship to other frames of the video such that different computing resources are used to partially or fully perform the encoding process of at least one type of frame than are used for partially or fully performing the encoding process of at least one other type of frame. For example, the types of frames may include I frames that are intra-frame encoded with no other frames as a reference, P frames encoded with one previous I or P frame as a reference and B frames encoded with one previous and one future frame as references and the B frames are encoded using different computing resources than used for the I or P types of the frames. The computing resources may include one or more central processing units (CPUs) and graphics processing units (GPUs) where the processing of different types of frames is performed by a CPU or a GPU. The CPUs may be the resources configured to encode I and P types of frames and the GPU may include shaders configured to process kernels of frame data for the B frames and a fixed function video encoder configured to perform entropy encoding of the B frames.

BRIEF DESCRIPTION OF THE DRAWINGS

A more detailed understanding may be had from the following description, given by way of example in conjunction with the accompanying drawings.

FIG. 2 is a diagram of an example of processing different types of video frames utilizing different computing resources in accordance with one or more disclosed embodiments.

FIG. 3 is a diagram of an example of processing different types of video frames utilizing different computing resources in accordance with one or more disclosed embodiments.

FIG. 4 is an illustration of overlap processing exhibited in the example of FIG. 3.

FIG. 6 is a diagram of an example of processing different types of video frames utilizing different computing resources in accordance with one or more disclosed embodiments.

FIG. 7 is a diagram of an example of processing different types of video frames utilizing different computing resources in accordance with one or more disclosed embodiments.

DETAILED DESCRIPTION

Methods and apparatus are used to process video data according to the embodiments described herein and in the accompanying Appendix A which is incorporated herein by reference as if fully set forth.

Figure 1:
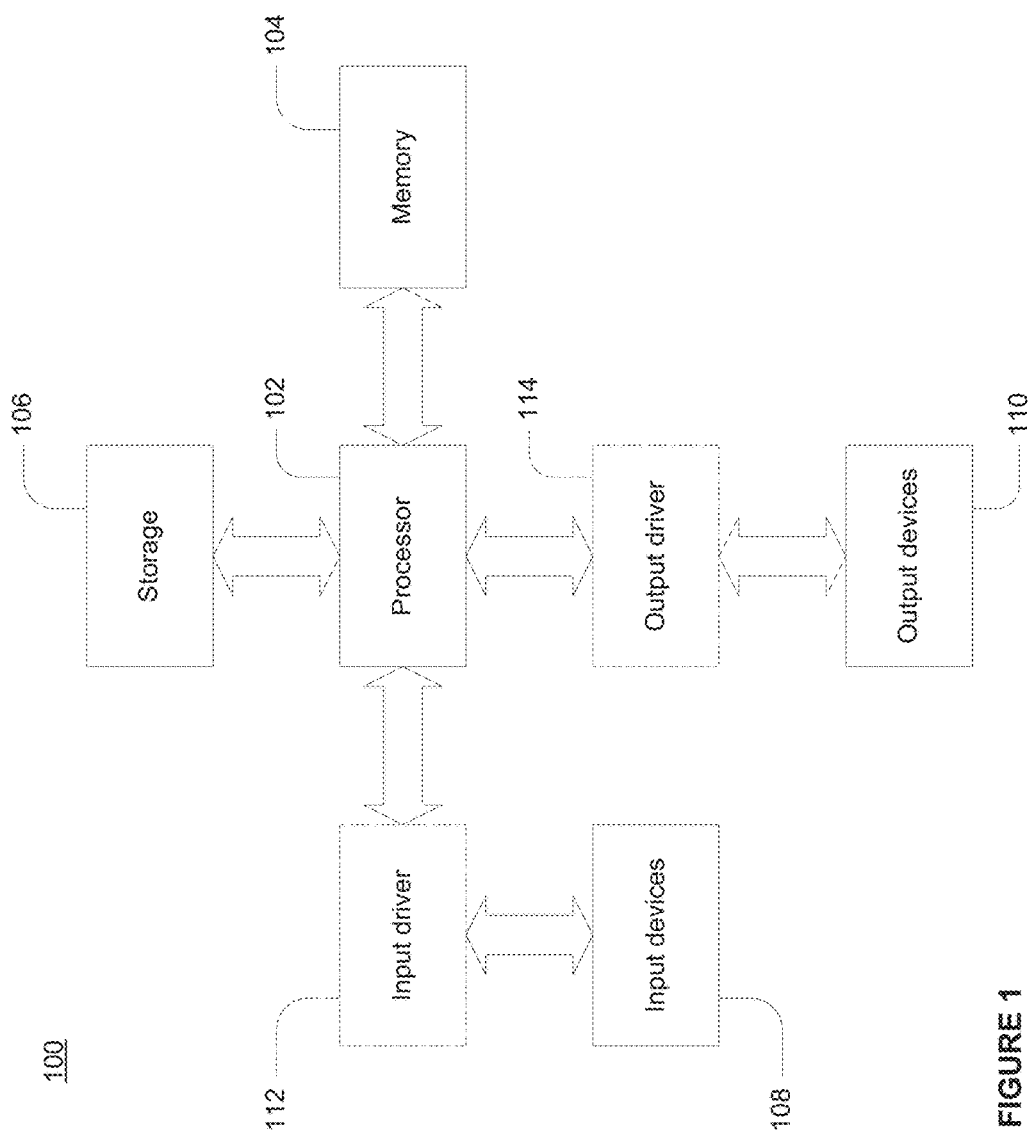
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may be an accelerated processing unit (APU) and/or may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache. The processor 102 may execute the video coding method, which may be stored as executable code on the memory 104.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Generally, the basic processes for encoding different types of frames of a video are well known in the art. However, the speed at which the data of the video frames are processed as a whole, i.e. throughput, can be determinative if a video can be displayed without interruption and/or distortion.

In a modern APU that has both CPU and GPU components, there is a vast amount of computing resources. However there are different computing engines that are diverse in their relative performance at different workloads. The CPU portion has fast out-of-order integer processing as well as a fairly good single instruction, multiple data (SIMD) engine (bytes, words, dwords, qwords, single-precision FP, double-precision FP) that is 128-512 bits wide. There may be 2, 4 or more CPU cores with this SIMD width. The GPU portion generally has a much greater SIMD capacity through the use of shaders and is much more power efficient, but runs at a lower clock speed than the CPU cores and with a longer latency. The GPU portion may also have a number of fixed function blocks for video processing. For example, a GPU may be configured with a functional block that is directed to all or part of a video encoding pipeline such as, for example, a Video Codec Engine (VCE) functional block in GPUs available from Advanced Micro Devices, Inc. These video encoding functional blocks are configured to perform one or more parts of the video encoding pipeline such as, for example, entropy encoding.

Combining these resources to work on a single workload can harness the advantages of each and resulting in a significant gain in total throughput for video encoding.

Some embodiments of the invention allow for the minimum or a reduced amount of specialized video die space to be added to an Application Specific Integrated Circuit (ASIC) in order to get a specific amount of video encoding throughput for a given video codec, such as H.264, MPEG-2, VC-1 or new codecs, such as H.265 that is also known as High Efficiency Video Coding (HEVC).

In an embodiment, a video comprising a plurality of frames is encoded by selectively using a plurality of computing resources to encode various types of frames of the video where the frames are categorized based on a frame's referential relationship to other frames of the video. Different computing resources are used to partially or fully perform the encoding process of at least one type of frame than are used to partially or fully perform the encoding process of at least one other type of frame.

One embodiment uses 1080p H.264 as an example, but is applicable for other frame sizes and other codecs. In this embodiment, different computing resources are used to process I, P and B types of frames of a video, where an I frame is an intra-frame encoded with no other frames as a reference; a P frame is encoded with one previous I or P frame as a reference and a B frame is encoded with one previous and one future frame as references.

In one non-limiting example, one or more CPU portions of an APU are configured to encode I and P frames of a video and a GPU of the APU performs encoding of B frames of a video. In such example, the GPU may include shaders, configured by or executing shader code, configured to process kernels of frame data for initial portion of encoding the B frames and a fixed function video encoder configured to perform entropy encoding of the B frames to complete the B frame video encoding process. In a modification of such example, some or all of the P frames are encoded using the same resources as the B frames and the I frames are encoded using one or more CPUs. Similarly another variation is where some or all of the I frames are encoded using the same resources as the B frames and the P frames are encoded using one or more CPUs.

In a further modification of such example, the GPU shaders are used to process kernels of frame data for the B frames, the fixed function video encoder are used to perform entropy encoding of the I, P and/or B frames, and one or more CPUs are used to perform other portions of the encoding processing of either the I or P frames or both the I and P frames.

The fixed function video encoder may be in the form of a Video Codec Engine (VCE) configured to perform full processing of video frames with a selectable mode for receiving the results of kernel execution of a B frame to then perform entropy encoding that B frame. The use of a fixed function video encoder typically permits entropy encoding to be performed in a single pipeline stage or clock cycle. The fixed function video encoder or VCE may reside as a separate component outside of a GPU and may be a separate component within the APU.

With respect to such an example APU, the CPU portions may be configured to initially receive the video frame data and subsequently control the output of the encoded frames. In such case, the CPU portions are configured to either process a frame when it as the video frames are input or copy it to a GPU portion of the APU. In this example, where the frames are I or P type frames, the CPU performs the encoding process on those types of frames and, where the frames are B frames, the CPU copies the frame data to the GPU for processing. Once the CPU completes encoding of the I and P frames, it the copies the resultant encoded frames to the GPU to be used as reference data for the encoding of B frames.

The GPU receives from the CPU portions, the unencoded B frame data and the data of the encoded I and P frames which it uses in the encoding of the B frames. The B frame encoding is divided in two parts as well known in the art: kernel processing and entropy processing. As referenced above, the GPU may use GPU shaders to perform the execution of the B frame kernels and pass the results to a VCE to complete the B frame encoding process by performing entropy encoding. The processed B frame data is then copied back to the CPU portions so that the CPU portions can output the stream of processed video frames.

FIGS. 2, 3, 6 and 7 illustrate how ten example sequential frames, 1-10, of a video are processed in such an example APU over periods of time denoted as pipeline stages. In these examples a typical IBBP frame structure is illustrated that may be used with 1920×1080 sized frames where P frame 4 is dependent on I frame 1; P frame 7 is dependent on P frame 4; P frame 10 is dependent on P frame 7; B frame 2 is dependent on I frame 1 and P frame 4; B frame 3 is dependent on I frame 1 and P frame 4; B frame 5 is dependent on P frames 4 and 7; B frame 6 is dependent on P frames 4 and 7; B frame 8 is dependent on P frames 7 and 10; and B frame 9 is dependent on P frames 7 and 10.

Although B frame 2 in the examples is copied to the GPU during pipeline stage 2, the GPU awaits the copying of the processed/encoded P frame 4 before commencing the processing of B frame 2 since the processing of B frame 2 requires the data from both the encoded prior and subsequent frames upon which it depends, in this case the encoded data from both prior I frame 1 and subsequent P frame 4. This does result in a ramp up throughput cost for the initial frames of a video that are processed, but the overall throughput rate tend to level out once the GPU processing begins producing processed frames.

FIG. 2 illustrates an example where the CPU is able to process I and P frames in a single pipeline stage. After priming the pipeline, the encode throughput rate is equal to 1 frame per time period, i.e. pipeline stage. In an ideal situation, the time required for one pipeline stage is equal to the maximum of the times with respect to: CPU encoding of I or P frames (E), CPU copying of frame data to the GPU (CR, CP), GPU kernel execution with respect to B frames (K), entropy encoding of B frames (EN) and copying of the encoded B frames to the CPU (CS). Generally, CR is about equal to CP, and CS is much less than CP and a worst case is copy will be about three megabytes (3 MB) per frame. The time typically used for transferring 3 MB from CPU to GPU on a high-speed serial computer expansion bus such as PCIe 2.0 (×16) is about 0.8 milliseconds.

Where the I and P frame encoding can be performed in a single pipeline stage, as illustrated in FIG. 2, a single CPU will generally be sufficient to achieve a desired throughput. However, in some cases multiple pipeline stages may be required for one step.

FIGS. 3 and 6 illustrate examples where the CPU portions of the APU are not able to process I and P frames in a single pipeline stage. In these examples, the CPU takes much longer than the GPU to process a frame. In such case, multiple CPUs or CPU threads may be used for the I and P frame processing. For example, frames 1 and 7 may be processed by a first CPU or CPU thread and frames 4 and 10 may be processed by a second CPU or CPU thread. In all three cases, FIGS. 2, 3 and 6, the example GPU processes the B frames in two stages; a first stage for executing kernels by the GPU shaders and a second stage for performing entropy encoding by the GPU's VCE. In all three of these examples, throughput of one frame per stage is achieved, after initial startup.

Since P frames are dependent on either a prior I or P frame, problems can arise if processing the prior frame on which a P frame depends is not completed when processing of the P frame is commences as is the case illustrated in FIGS. 3 and 6. FIG. 4 illustrates the overlap of processing with respect to I frame 1 and P frame 4 of FIG. 3.

Several options exist for handling the concurrent processing of multiple frames when they overlap. One methodology is to use multiple threads/cores to finish the work faster, within a frame with these two options:

1. Encode with multiple H.264 slices (i.e. one thread per slice) and
2. Use multiple threads for motion search, and then perform reconstruction and encoding serially.

However, option 1 relies on H.264 slices, which is specific to H.264, and may reduce the rate-distortion quality due to blocking of motion search across the slice boundaries. Option 2 does not fully utilize the CPU resources since it involves a serial portion.

Another option is to use one thread per frame and use inter-thread communication to resolve dependencies. Since there is some required time delay between the start of each frame's processing, one can provide some time stagger and allow one frame to work ahead of the subsequent frame by a minimum fixed amount. This allows the first frame to complete some portion of the encoding and reconstruction before the following frame starts as illustrated in FIG. 5 that shows a few macroblocks (MBs) for illustrative purposes of two frames; an actual 1080p frame has 120×68 MBs.

Figure 5:
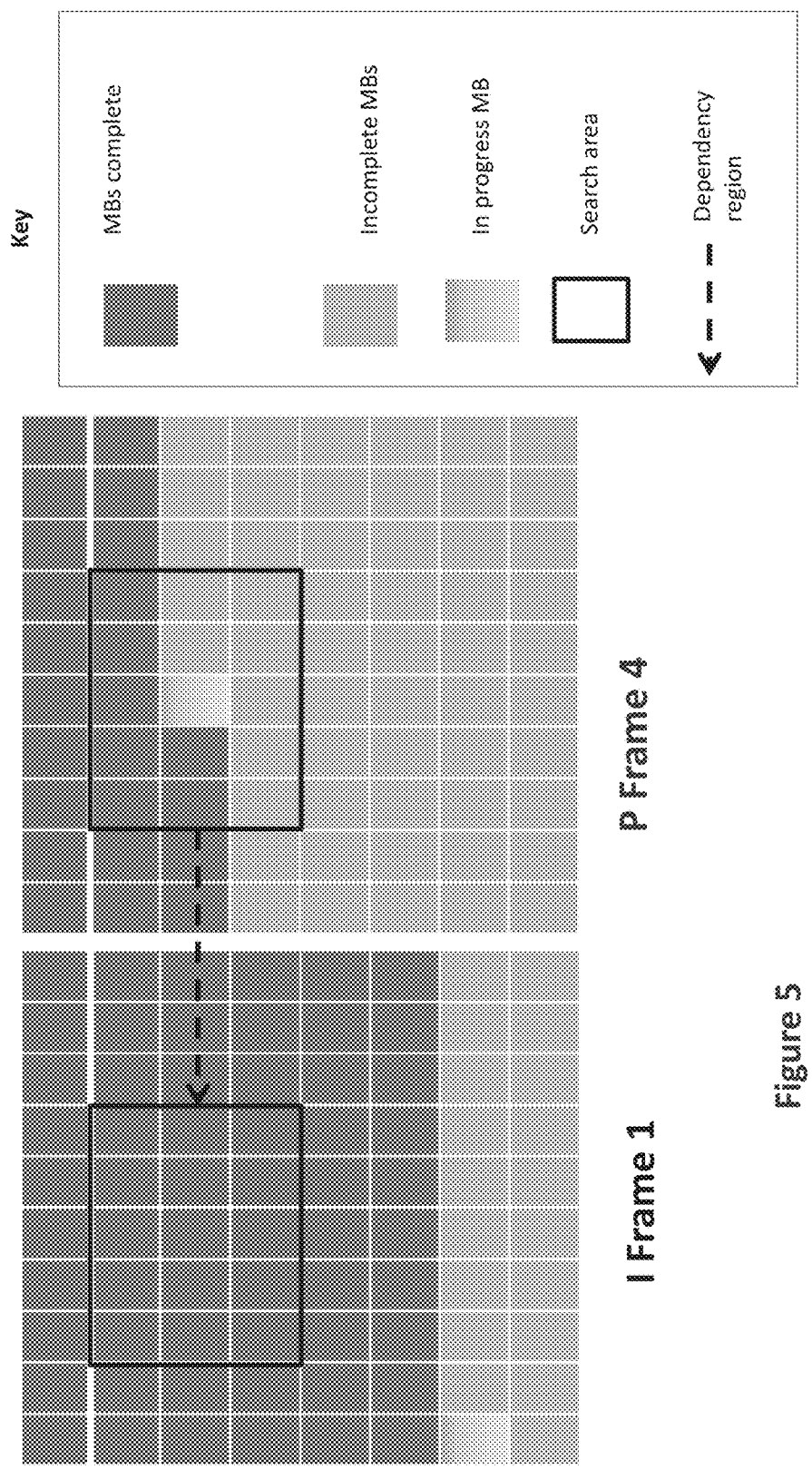
FIG. 5 is a detailed illustration of on embodiment of addressing the overlap processing exhibited in the example of FIGS. 3 and 4.

As illustrated in the example of FIG. 5 with respect to the I Frame 1 and P Frame 4 for FIG. 4 (and FIG. 3), P frame 4 will search a selected portion of I frame 1 upon which it depends as it processes MBs of data of the P frame in series. With respect to the "in progress" MB of P frame 4 illustrated in FIG. 5, the MBs within outlined search area in I frame 1 which is used in processing the P frame 4 MB is made of completely processed MBs, even though there are some MBs within I frame 1 that are not yet fully processed.

Generally, the time delay in starting the processing of a P frame may be selected to assure that the search area of the prior frame required for processing a particular macroblock of the P frame has been processed by the time that the processing of that particular macroblock commences. Additionally, both the multiple-threads per frame and multiple threads working on multiple frames methods may be implemented.

FIG. 7 illustrates a case where both the processing of I and P frames by the CPU and the kernel execution for B frames by the GPU shaders require multiple pipeline stages to complete. In this example, both the CPU and GPU shader processing are longer than the entropy encoding time. Here, the GPU shader time becomes the limiting factor. However, throughput of three frame is achieved in the time it takes for the GPU shaders to execute the kernels for two B frames. This again provides an increased overall throughput through the selective use of the different processing components.

In order to further increase throughput time in such a case, multiple GPUs can be used to reduce the limiting factor of GPU shader processing time with a single GPU. In such case each GPU may include its own fixed function video encoder (e.g. VCE) or one fixed function video encoder within the example APU may be provided for this function.

With respect to rate control, in a traditional serial, frame-by-frame encoder, the rate control logic allocates a bit budget for each frame based on parameters such as the desired file size, frame complexity, scene changes and frame type. From an overview perspective, once a frame is completed the actual bits consumed are fed back into the model and the next frame is budgeted and encoded, and so on.

In the above embodiments of deeply pipelined encoding, there can be many frames in flight at once. The bit budget for any given frame should be predicted before previous frames are completed or possibly before previous frames are even started. The time between when a frame is queued and scheduled on a GPU, for example, and when it actually starts can be very long.

The effects of events such as a scene change can ripple through many frames if not handled smartly.

These issues may be addressed by:

Predicting the bit budgets for frames, as they get scheduled.

Collecting the actual bits consumed by frames on a row by row basis (could be at any granularity) and sending this updated information to all frames that are in mid-flight so that they can adjust their bit budgets for macroblocks not yet encoded.

Feeding the final bits consumed per frame back in to the bit budgeting logic.

Detecting scene changes early, in the CPU, and broadcasting this to frames already in flight so that bit budgets can be changed and/or reference frames modified. For example, a B frame normally has a forward and backward reference frame and one of these frames can be removed from the motion search list if a scene change has been detected.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of encoding video comprising a plurality of frames, the method comprising:
    using a plurality of computing resources for encoding for various types of frames of the video where the frames are categorized based on a frame's referential relationship to other frames of the video and the frames are encoded based on frame type,
    wherein the types of frames include I frames that are intra-frame encoded with no other frames as a reference, P frames encoded with one previous I or P frame as a reference and B frames encoded with one previous and one future frame as references,
    wherein one or more central processing units (CPUs) perform encoding of I frames and P frames and a graphics processing unit (GPU) performs entropy encoding of B frames.

2. The method of claim 1 wherein the GPU uses shaders to execute kernels for the B frames and uses a fixed function video encoder configured to perform entropy encoding of the B frames.

3. The method of claim 1 wherein graphics processing unit (GPU) shaders are used to execute kernels for the B frames, a fixed function video encoder is used to perform entropy encoding of the I, P and B frames, and one or more central processing units (CPUs) perform other portions of the encoding of I or P frames.

4. The method of claim 1 wherein one or more central processing units (CPUs) of an accelerated processing unit (APU) perform encoding of I frames and P frames and a graphics processing unit (GPU) of the APU performs encoding of B frames of the video in association with a fixed function video encoder that performs entropy encoding.

5. The method of claim 1 further comprising:
predicting bit budgets for frames, as frames are scheduled for processing;
collecting information of actual bits consumed by frames on a row by row basis and sending this information to all frames that are in process to enable bit budget adjustments for macroblocks not yet encoded;
using information of final bits consumed per frame for predicting and bit budgeting adjustments; and
using detection of scene changes for predicting and bit budgeting adjustments and/or reference frames modifications.

6. An apparatus for encoding video comprising a plurality of frames comprising:
a plurality of computing resources selectively configured to encode various types of frames of a video where the frames are categorized based on a frame's referential relationship to other frames of the video and the frames are encoded based on frame type,
wherein the types of frames include I frames that are intra-frame encoded with no other frames as a reference, P frames encoded with one previous I or P frame as a reference and B frames encoded with one previous and one future frame as references,
wherein one or more central processing units (CPUs) perform encoding of I frames and P frames and a graphics processing unit (GPU) performs entropy encoding of B frames.

7. The apparatus of claim 6 wherein the GPU includes shaders configured to execute kernels for the B frames and a fixed function video encoder configured to perform entropy encoding of the B frames.

8. The apparatus of claim 6 including an accelerated processing unit (APU) at least one central processing unit (CPU) configured to perform at least partial encoding of I frames or P frames of the video and at least one graphics processing unit (GPU) configured to perform at least partial encoding of B frames of the video.

9. The apparatus of claim 8 wherein the APU includes a fixed function video encoder configured to perform entropy encoding of I, P and B frames of the video.

10. The apparatus of claim 9 wherein the fixed function video encoder resides within a GPU of the APU.

11. The apparatus of claim 8 wherein the APU is configured to:
predict bit budgets for frames, as frames are scheduled for processing;
collect information of actual bits consumed by frames on a row by row basis and sending this information to all frames that are in process to enable bit budget adjustments for macroblocks not yet encoded;
use information of final bits consumed per frame for predicting and bit budgeting adjustments; and
use detection of scene changes for predicting and bit budgeting adjustments and/or reference frames modifications.

12. A non-transitory computer-readable storage medium storing a set of instructions for execution by a general purpose computer to facilitate manufacture of an integrated circuit that includes:
a plurality of computing resources for encoding for various types of frames of the video where the frames are categorized based on a frame's referential relationship to other frames of the video and the frames are encoded based on frame type,
wherein the types of frames include I frames that are intra-frame encoded with no other frames as a reference, P frames encoded with one previous I or P frame as a reference and B frames encoded with one previous and one future frame as references,
wherein one or more central processing units (CPUs) perform encoding of I frames and P frames and a graphics processing unit (GPU) performs entropy encoding of B frames.

13. The non-transitory computer-readable storage medium of claim 12, wherein the instructions are hardware description language (HDL) instructions used for the manufacture of a device.

14. The non-transitory computer-readable storage medium of claim 13, wherein the GPU includes shaders configured to execute kernels for the B frames and a fixed function video encoder configured to perform entropy encoding of the B frames.

* * * * *